United States Patent Office 2,824,112
Patented Feb. 18, 1958

2,824,112

PRODUCTION OF ALPHA CHLOROSTYRENE OXIDE

William A. McMinn, Jr., Brookline, Mass., assignor to Escambia Chemical Corporation, Pace, Fla., a corporation of Delaware No Drawing. Application September 24, 1956
Serial No. 611,769

5 Claims. (Cl. 260—348)

This invention relates to the production of chemicals and more particularly to the production of alpha chlorostyrene oxide.

A principal object of this invention is to produce the new compound, alpha chlorostyrene oxide, by the chlorination of styrene oxide.

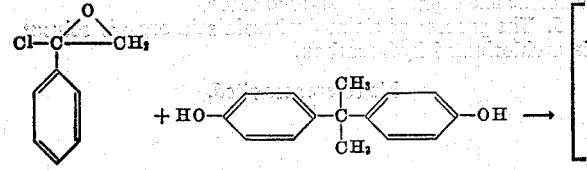

Other objects of the invention will in part be obvious and will in part appear hereinafter.

The invention accordingly comprises the process involving the several steps and the relation and the order of one or more of such steps with respect to each of the others, and the product possessing the features and properties which are exemplified in the following detailed disclosure and the scope of the application of which will be indicated in the claims.

For a fuller understanding of the nature and objects of the invention, reference should be had to the following detailed disclosure.

In recent years, the preparation and use of many epoxy resins has become widely known and has achieved much commercial success. One classic example and perhaps the most widely used commercial preparation of epoxy resins involves the reaction between epichlorohydrin and bis-phenol A. The preparation of such resins may be shown as follows:

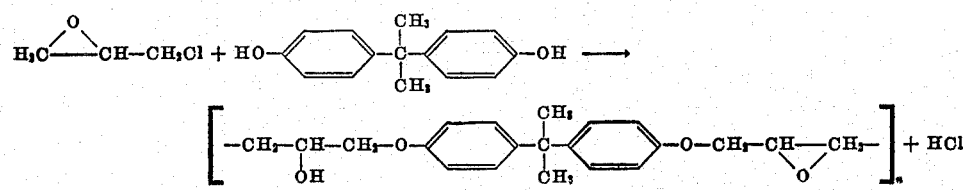

In the above type of epoxy resins the ether linkage is separated from the carbon atom containing the epoxy linkage by at least one carbon atom. This arrangement may be illustrated by the general formula

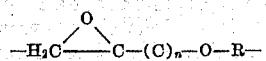

In the present invention, there is produced the new compound, alpha chlorostyrene oxide which can be used to obtain new and useful types of epoxy resins. In these new resins, the ether linkage in the resin is attached to one of the carbon atoms containing the epoxy linkage. This arrangement may be illustrated by the general formula

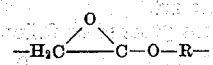

The use of alpha chlorostyrene oxide with bisphenol A in the preparation of an epoxy resin may be shown as follows:

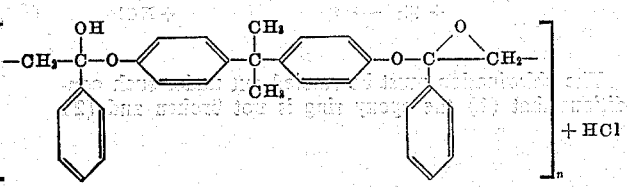

In one preferred embodiment of the present invention, alpha chlorostyrene oxide is prepared by a low temperature chlorination of styrene oxide. The chlorination preferably takes place at temperatures below about 10° C. and in the presence of a chlorination catalyst; the preferred catalyst being ultraviolet light action. In another preferred embodiment of the invention, the chlorination is carried out in an organic solvent which is inert to chlorine and the product, alpha chlorostyrene oxide. The preferable organic solvents are chlorinated hydrocarbons; the preferred solvent being carbon tetrachloride.

A specific detailed method of practicing the present invention is set forth in the following non-limiting examples.

*Example I*

150 cc. of carbon tetrachloride were placed in a flask and cooled to 0° C. 120 grams of styrene oxide were then added and the entire contents were cooled to —5° C. The cooled mixture was then exposed to ultraviolet light rays from a suitable source. A very slight vacuum (about 500 mm.) was maintained on the system throughout the reaction to remove hydrogen chloride as rapidly as it was formed. While stirring the mixture, chlorine was then admitted for about 1.5 hours, the reaction temperature during this period being controlled between about −5° C. and 0° C. Approximately 24.4 grams of chlorine were taken up by the reaction or enough for a 70 percent conversion of styrene oxide to alpha chlorostyrene oxide. The resulting reaction mixture was very fluid and light yellow in color and consisted of about 90 grams of product, alpha chlorostyrene oxide.

*Example II*

About 160 cc. of carbon tetrachloride and 110 grams of styrene oxide were placed in a flask and cooled to about −5° C. The cooled mixture was exposed to ultraviolet light rays from a suitable source and a slight vacuum was maintained on the system throughout the reaction. While stirring the mixture, chlorine was admitted for about 1.5 hours, the reaction temperature during this period being controlled between about −5° C. and 0° C. Approximately 32 grams of chlorine were taken up by the reaction. This represents about a 98 percent conversion of styrene oxide to alpha chlorostyrene oxide.

The resulting reaction mixture was a very viscous, essentially water-white liquid and consisted of about 125 grams of product, alpha chlorostyrene oxide. The color of the product, alpha chlorostyrene oxide, is entirely dependent upon the amount of hydrogen chloride and/or chlorine not removed during final recovery. Methods for complete removal of hydrogen chloride and/or chlorine from the final product are within the knowledge of those skilled in the art.

The above reactions proceed as follows:

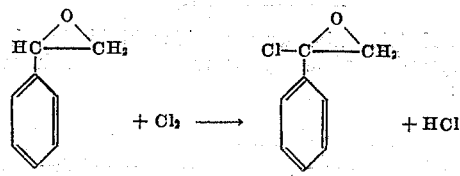

The chlorination must be carried out under such conditions that (1) the epoxy ring is not broken and (2) no substantial amount of polymerization of the styrene oxide takes place. Low temperatures and particularly, temperatures below about 10° C. are preferable for the reaction. Temperatures above this are conducive to polymerization and breaking of the epoxy ring leading to chlorinated hydroxy type compounds.

Chlorine, at least in the stoichiometric amount required to form alpha chlorostyrene oxide, is employed. However, a slight excess can be used.

The use of an organic solvent, particularly chlorinated hydrocarbons which are inert to chlorine and alpha chlorostyrene oxide, is desirable since it exerts a diluent effect and helps to inhibit or minimize polymerization of the styrene oxide during the chlorination. The preferred solvent has been found to be carbon tetrachloride.

Catalysts may also be employed during the chlorination. In the instant case, ultraviolet light rays have been found to be suitable as the catalyst. Other catalysts which can be used in the present reaction are phosphorus trichloride and phosphorus pentachloride.

Since certain changes may be made in the above process and product without departing from the scope of the invention herein involved, it is intended that all matter contained in the above description shall be interpreted as illustrative and not in a limiting sense.

What is claimed is:

1. The process of producing alpha chlorostyrene oxide which comprises reacting at a temperature below about 10° C. styrene oxide and chlorine in carbon tetrachloride solvent, said reaction mixture being subjected to the catalytic effect of ultraviolet light rays.

2. The new chemical compound, alpha chlorostyrene oxide.

3. The process for producing alpha chlorostyrene oxide which comprises subjecting styrene oxide and chlorine to ultraviolet light rays at a temperature below about 10° C.

4. The process of producing alpha chlorostyrene oxide which comprises subjecting styrene oxide and chlorine to ultraviolet light rays at a temperature below about 10° C. while dissolved in an organic solvent which is inert to chlorine and alpha chlorostyrene oxide.

5. The process of claim 4 wherein said organic solvent is a chlorinated hydrocarbon.

No references cited.